March 4, 1952

L. D. TYSON 2,587,929

STEADY REST

Original Filed Sept. 1, 1943

INVENTOR.
Levi D. Tyson
BY
Attorney

March 4, 1952 — L. D. TYSON — 2,587,929
STEADY REST
Original Filed Sept. 1, 1943 — 3 Sheets-Sheet 2

INVENTOR.
Levi D. Tyson.
BY
Attorney

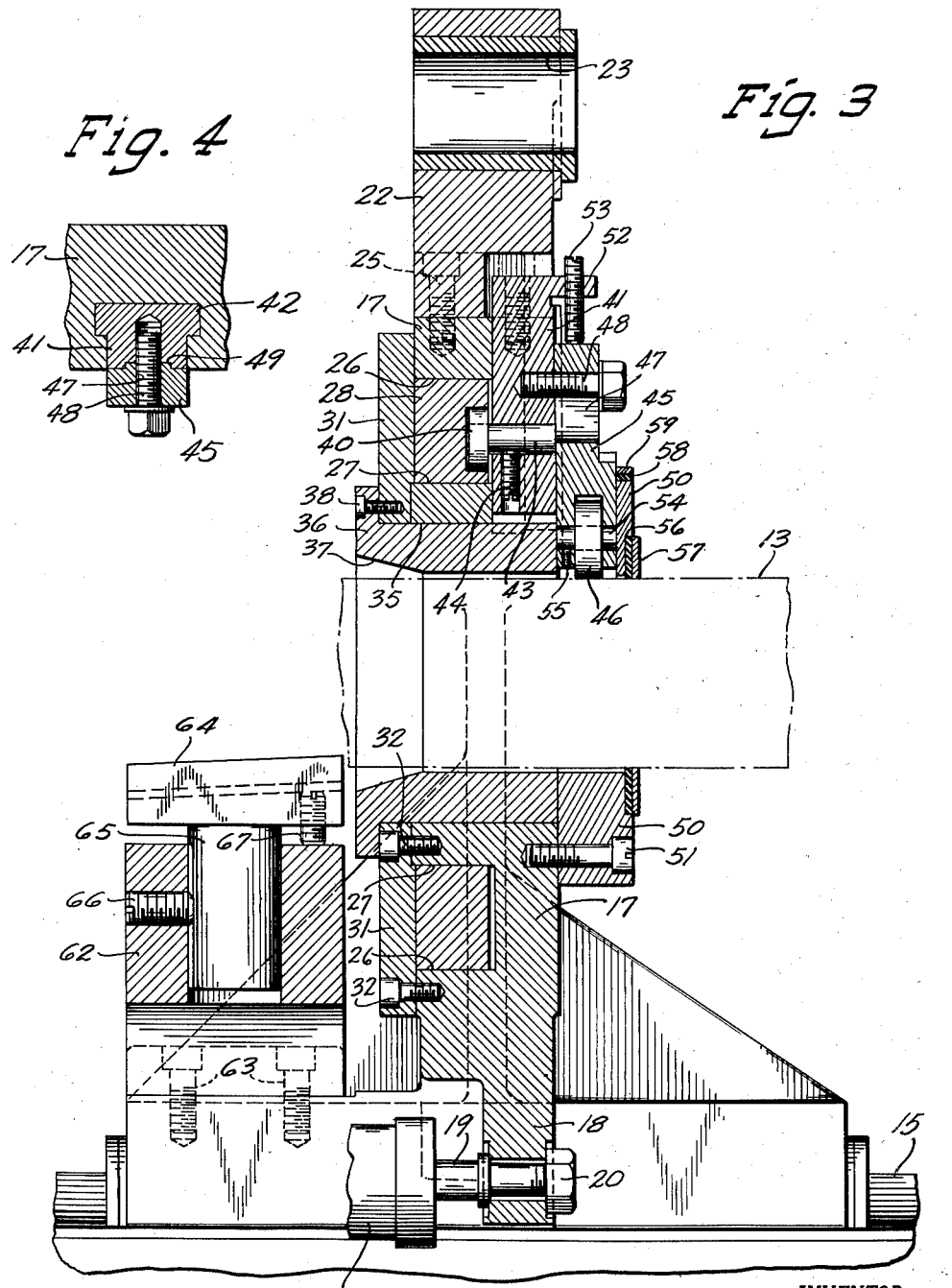

Patented Mar. 4, 1952

2,587,929

UNITED STATES PATENT OFFICE 2,587,929

STEADY REST

Levi D. Tyson, Elkhart, Ind., assignor, by mesne assignments, to Gisholt Machine Company, Madison, Wis., a corporation of Wisconsin Continuation of application Serial No. 500,801, September 1, 1943. This application August 19, 1946, Serial No. 691,611

7 Claims. (Cl. 82—39)

This invention relates to improvements in steady rests for use with lathes and the like for the purpose of supporting long cylindrical workpieces against deflection from the cutting tool pressures.

This application is a continuation of my abandoned application Serial No. 500,801, filed September 1, 1943, for the same subject matter.

An object of the invention is to provide a steady rest which is more sturdy for use with higher speed machining operations.

Another object of the invention is to provide a steady rest which has greater adjustability for different diameters of work and which is more quickly and easily operated.

Another object is to provide a steady rest in which the jaws may be more readily moved to and secured in operative work-engaging position simultaneously.

Another object is to provide a steady rest which is more effectively supported against lateral movement from the tool pressures on the work.

Another object is to provide a steady rest which has its jaw supporting and operating mechanism readily accessible for adjustment and repair.

Another object is to provide a steady rest in which the jaws and work are protected against metal chips and foreign particles lodging between the same.

Further objects and advantages of the invention will appear hereinafter.

Referring to the drawings which illustrate an embodiment of the invention:

Fig. 3 is a longitudinal vertical sectional view taken on the line 3—3 of Fig. 2;

Fig. 4 is a detail fragmentary section taken on line 4—4 of Fig. 2; and

Fig. 5 is a transverse section taken on line 5—5 of Fig. 1 without the workpiece.

Figure 1:
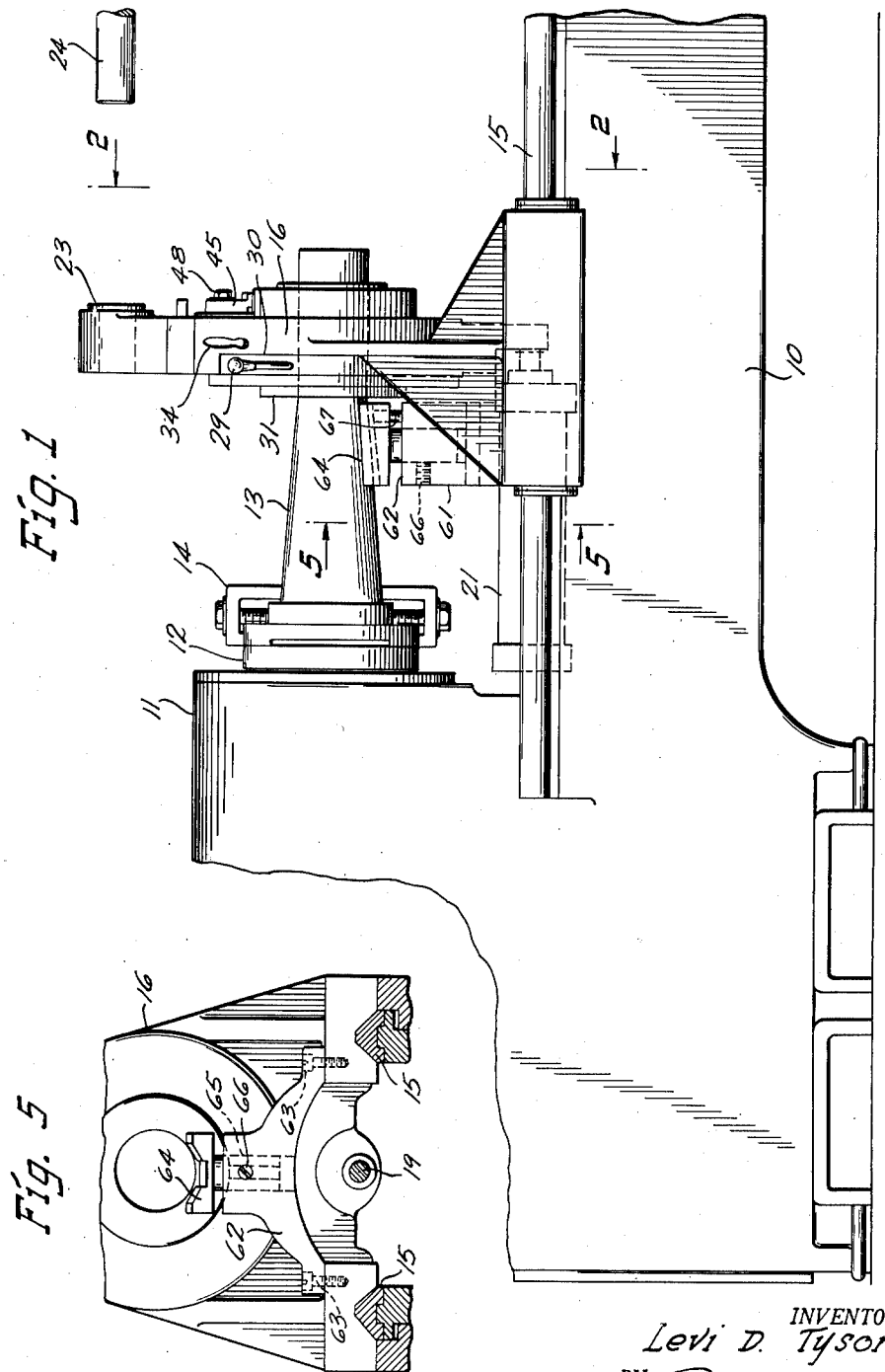
Figure 1 is a side elevation of a part of a lathe showing the steady rest mounted thereon and supporting a workpiece.
Figure 2:
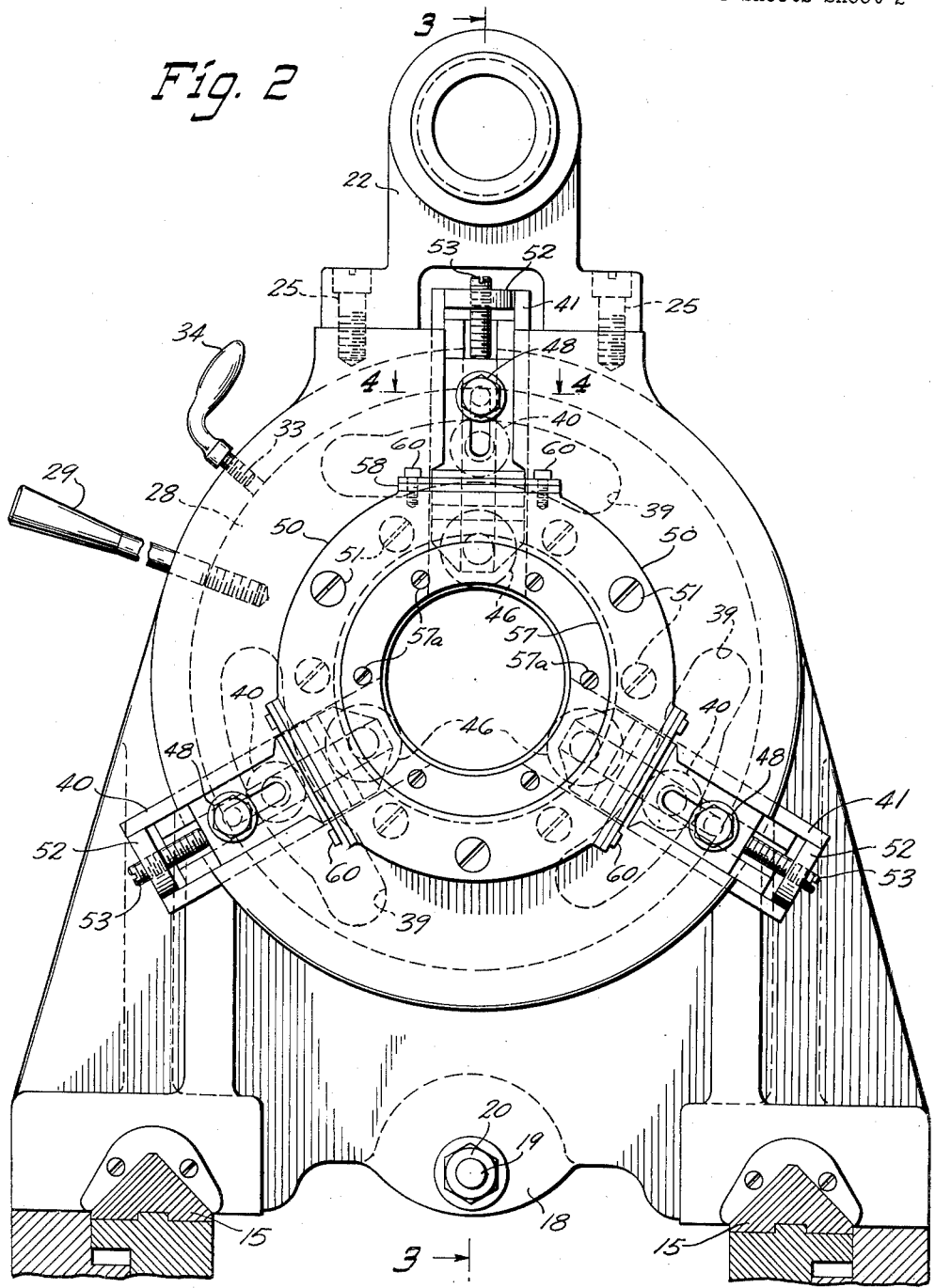
Fig. 2 is a transverse vertical sectional view of the lathe taken on the line 2—2 of Fig. 1.

The bed 10 of the lathe has a headstock 11 containing a rotary spindle 12 adapted to carry the workpiece 13. A clamp or chuck 14 is provided to secure the workpiece 13 axially of the spindle 12.

The bed 10 of the lathe has the ways 15 extending parallel to the axis of spindle 12 and which support the steady rest 16. The ways may extend rearwardly to support a tailstock or turret slide, not shown.

The steady rest 16 comprises the body portion 17 mounted on the ways 15 having a central depending transverse flange 18 with a hole therein for receiving a rod 19 which is secured thereto by a nut 20. A cylinder 21 has a piston for moving the rod 19 longitudinally to effect longitudinal movement of the steady rest to position the same on the ways 15, the cylinder 21 and rod 19 being parallel to the ways 15.

The body portion 17 of the steady rest is circular with the axis of the opening therethrough generally coinciding with the axis of spindle 12.

A cap member 22 is provided on top of the circular body portion 17 and is apertured in a direction parallel to the axis of the body portion and to ways 15. A bushing 23 is secured within the aperture in cap 22 and is adapted to receive the pilot bar 24 carried by the movable tailstock or turret (not shown).

The pilot bar 24 has a sliding fit in bushing 23 and serves to cooperate with the ways 15 and more securely hold the steady rest against lateral pressures.

The cap member 22 is secured to the body portion 17 by means of bolts 25.

The body 17 of the steady rest has an annular recess in its side facing spindle 12, the recess being concentric with the axis of the body and having an outer cylindrical wall 26 and an inner cylindrical wall 27.

A cam ring 28 is mounted for limited rotational movement in the recess and is confined against lateral movement by the walls 26 and 27.

A handle 29 is secured to the ring 28 and extends radially outward through a slot 30 in body 17 to facilitate manual movement of the ring 28.

A cover plate 31 is secured to body 17 by bolts 32 over the recess containing ring 28 to hold the latter in place.

The ring 28 is secured against rotational movement at any position of adjustment by means of a set screw 33 having a handle 34 and threaded radially through the body 17.

The body 17 has its central bore 35 fitted with a bushing 36 which has a flared opening 37 facing the spindle 12. The bushing is adapted to receive the work 13 loosely and is secured to cover plate 31 by bolts 38.

The cam ring 28 has a plurality of cam slots 39 in its inner face, the slots being of uniform width and correlated in contour to provide a working portion for each slot eccentric to the body 17.

A cam follower in the form of a roller 40 rides in each slot 39 and is moved radially in and out by the corresponding rotational movement of ring 28.

Each cam roller 40 is rotationally mounted on the back side of a separate crosshead 41 which is of T shape having flanges 42 fitting into corresponding recesses in body 17, the crossheads being disposed for radial movement relative to the body 17 and in separate slots opening at the periphery of the body.

Studs 43 constitute stub axles for the rollers 40, and each stud is secured in place in a corresponding crosshead 41 by means of a set screw 44.

A jaw 45 having a work contact roller 46 at its inner end is adjustably secured to the face of each crosshead 41 in a manner providing for radial adjustment of the jaw. For this purpose each jaw has a radial slot 47 therethrough for receiving the shank of a bolt 48 which is threaded into the corresponding crosshead 41.

A central tongue 49, on the back side of each jaw 45 rides in a corresponding groove in the face of the corresponding crosshead 41 and serves to interlock the jaw and crosshead and prevent displacement of the jaw by possible pivotal action on bolt 48.

A cover plate 50 is secured on the face of body 17 by screws 51 and extends circumferentially of the work 13 across the inner ends of the slots for crossheads 41. The jaws 45 extend through corresponding radial slots in the cover plate 50 and are spaced equally about the circumference of the same.

Each crosshead 41 has a flange 52 at its outer end and which overhangs the end of the corresponding jaw 45 to limit the outward adjustment of the jaw relative to the crosshead. A threaded stud 53 is threaded through each flange 52 and into engagement with the outer end of the corresponding jaw 45 to provide an adjustable stop for the jaw limiting its outward position relative to its crosshead 41.

The jaw rollers 46 are adapted to oppose each other in engaging the work 13 and are mounted for free rotation upon corresponding short shafts 54 secured in the bifurcated inner end of the corresponding jaws by means of set screws 55.

The engagement between the jaw rollers 46 and the work 13 is kept free from metal chips and foreign matter that might injure the rollers and the work by means of a flexible sealing washer 56 held in place in a recess in the cover plate 50 by a ring 57. The seal 56 has an internal diameter approximating the diameter of the work 13 and is adapted to seal thereagainst sufficiently to prevent ingress of foreign material to the rollers 46.

A seal strip 58 is secured in a recess on the outer circumference of plate 50 across the face of each jaw 45 to seal against the jaw and prevent ingress of chips between the jaw and the plate by reason of radial movement of the jaws. The seal strips 58 are secured in place by corresponding metal plates 59 fastened by bolts 60.

The steady rest has a piloting member 61 disposed on the side of the steady rest facing spindle 12 and which has its base 62 bridging the base of the steady rest and secured thereto by bolts 63.

A pilot block 64 is supported on base 62 by means of a downwardly extending shank 65 disposed in a corresponding hole in the base. A radial screw 66 rides in a vertical groove in the shank 65 to secure the shank against turning in base 62.

A threaded stud 67 is threaded downwardly through block 64 to engage the top of base 62 and provide for adjustment of the height of the pilot block.

The pilot block 64 has its upper surface inclined upwardly toward the flared entrance to bushing 36, and grooved longitudinally to guide the workpiece into the bushing. The block is particularly useful where the workpiece is positioned in the steady rest prior to final chucking or is of substantial length.

The operation of the steady rest is simple and accurate. Assuming that the jaws 45 have been set at the desired radial position on crossheads 41 and that the jaws and crossheads are held in expanded position by the cam ring 28 having been turned to its limit in a clockwise direction, and assuming that the work 13 has been chucked to spindle 12 and the steady rest 16 moved longitudinally toward the spindle 12 by means of cylinder 21, the operator merely pulls down on lever 29, turning the cam ring 28 in a counterclockwise direction in which the rollers 40 are moved radially inward until rollers 46 of jaws 45 engage the work 13. Then the operator screws clamp 33 into engagement with ring 28 to secure the latter against turning.

As the tailstock or tool turret moves up into position, the cylindrical pilot bar 24 slides into the bushing 23 in the cap 22 to additionally secure the steady rest against lateral displacement and prevent chattering.

During machining of the work 13 and while the latter is turning with spindle 12, the jaws 45 and rollers 46 are fixed, radially, and serve as rigid supports for the work, opposing tool pressures and the like.

The cam slots 39 in ring 28 are constructed to move the jaws 45 both in and out. For this purpose the operative outer cam surface of each slot is on a sweeping curve somewhat eccentric to the axis of the work and of spindle 12 and body 17. At the outermost end of this outer cam surface each slot turns abruptly outwardly to provide an operative inner cam surface that engages the corresponding roller 40 to positively move the same radially outward to space the rollers 46 from the work.

The steady rest has its jaws mounted on an open face where they can be removed or adjusted readily. The jaws may be individually adjusted and thereafter they are operated simultaneously by cam ring 28 for repeated machining operations upon successive workpieces of like dimensions.

Various embodiments of the invention may be employed within the scope of the accompanying claims.

I claim:

1. A steady rest for use with lathes and the like, comprising a generally circular body member having a base adapted to be mounted for longitudinal movement on the bed of the lathe with said body member axially aligned with the lathe spindle, a ring member carried by said body member coaxial therewith and disposed for limited rotation relative thereto, a plurality of radially movable steady rest jaws mounted in slideways on said body member and having rollers at their inner ends for engaging a workpiece rotatably carried by the lathe spindle, cam means interlocking said ring member and jaws to effect movement of the latter radially inward when said ring is moved circumferentially in one direction and radially outward when said ring is moved circumferentially in the opposite direction, and a closure member on the face of said body member adapted to seal against the rotary workpiece around the circumference thereof and protect the working parts of the steady rest against injury from chips.

2. A steady rest for use with lathes and the like, comprising a body slidable on ways extending parallel to the axis of the lathe spindle, radially operable jaws carried by said body and adapted to rigidly support a workpiece against lateral displacement and having roller engagement with the workpiece to provide for free rotation of the latter therein, and a closure member secured to one face of the body on the side thereof toward the cutting operations of the lathe and adapted to seal against the work to protect said jaws and the work against the lodgement of metal chips and the like therebetween.

3. A steady rest comprising an annular body portion, a ring member rotatably carried by said body portion, a plurality of crossheads mounted in said body portion to have radial movement therein, said ring member and said crossheads having cooperating camming portions whereby rotation of said ring member will communicate radial movement to said crossheads, and an annular flexible member fixed coaxially relative to said annular body portion adapted to engage a piece of work to stop ingress of foreign material into said steady rest.

4. A steady rest comprising an annular body portion, a ring member rotatably carried by said body portion, a plurality of crossheads mounted in said body portion to have radial movement therein, said ring member and said crossheads having cooperating camming portions whereby rotation of said ring member will communicate radial movement to said crossheads, a plurality of work-engaging members, mounting means for each of said work-engaging members, each of said crossheads having one of said mounting means adjustably carried thereby, and an annular flexible member fixed coaxially relative to said annular body portion adapted to engage a piece of work to stop ingress of foreign material into said steady rest.

5. A steady rest comprising an annular body portion, a ring member rotatably carried by said body portion, a plurality of crossheads mounted in said body portion to have radial movement therein, said ring member and said crossheads having cooperating camming portions whereby rotation of said ring member will communicate radial movement to said crossheads, a plurality of work-engaging members, mounting means for each of said work-engaging members, each of said crossheads having one of said mounting means adjustably carried thereby, an annular flexible member fixed coaxially relative to said annular body portion adapted to engage a piece of work to stop ingress of foreign material into said steady rest, and other flexible means fixed relative to said body portion and adapted to slidably engage each of said mounting means for stopping access of foreign material to the interior of said steady rest past said mounting means.

6. A steady rest comprising an annular body portion, a ring member rotatably carried by said body portion, a plurality of radially spaced crossheads carried by said body portion, said crossheads and said ring member having cooperating camming portions whereby rotation of said ring member will communicate radial movement to said crossheads, work-engaging rollers, means for mounting said rollers, each of said mounting means having adjustable sliding relationship with a corresponding crosshead, and an annular member carried by said body portion, said annular member being provided with slots for receiving said mounting means and having annular flexible means adapted to engage a piece of work in said steady rest and to stop access of foreign material along said piece of work to the interior of said steady rest.

7. A steady rest comprising an annular body portion, a ring member rotatably carried by said body portion, a plurality of radially spaced crossheads carried by said body portion, said crossheads and said ring member having cooperating camming portions whereby rotation of said ring member will communicate radial movement to said crossheads, work-engaging rollers, means for mounting said rollers, each of said mounting means having adjustable sliding relationship with a corresponding crosshead, and an annular member carried by said body portion, said annular member being provided with slots for receiving said mounting means and having annular flexible means adapted to engage a piece of work in said steady rest and to stop access of foreign material along said piece of work to the interior of said steady rest, said annular member being provided with other flexible members adapted to engage said mounting means to prevent access of foreign material to the interior of said steady rest between said annular member and said mounting means.

LEVI D. TYSON.

REFERENCES CITED

The following references are of record in the file of this patent:

UNITED STATES PATENTS

| Number | Name | Date |
| --- | --- | --- |
| 334,538 | Muncaster | Jan. 19, 1886 |
| 562,271 | Blum | June 16, 1896 |
| 734,808 | Brown | July 28, 1903 |
| 944,630 | McCullough | Dec. 28, 1909 |
| 1,140,208 | Taylor | May 18, 1915 |
| 1,191,220 | Peterson | July 18, 1916 |
| 1,228,570 | Kupp | June 5, 1917 |
| 1,401,131 | Blackburn | Dec. 27, 1921 |
| 1,432,626 | Schurr | Oct. 17, 1922 |
| 1,432,753 | Hill | Oct. 24, 1922 |
| 1,506,035 | Valtman | Aug. 26, 1924 |
| 1,770,048 | Sundstrand | July 8, 1930 |
| 1,862,516 | Powell | June 7, 1932 |
| 2,012,826 | Montgomery | Aug. 27, 1935 |
| 2,016,482 | Brown | Oct. 8, 1935 |
| 2,016,843 | Tautz | Oct. 8, 1935 |